United States Patent [19]
Fischer

[11] 4,151,868
[45] May 1, 1979

[54] SHEAR ASSEMBLY HAVING PRIMARY AND SECONDARY MEMBERS

[75] Inventor: Robert L. Fischer, New Lenox, Ill.

[73] Assignee: Caterpillar Tractor Co., Peoria, Ill.

[21] Appl. No.: 745,744

[22] Filed: Nov. 29, 1976

[51] Int. Cl.² ............................................ A01G 23/08
[52] U.S. Cl. .................................. 144/34 E; 83/600; 83/675
[58] Field of Search .................. 144/2 Z, 3 D, 34 R, 144/34 E, 309 AC; 83/589, 590, 600, 646, 928, 675

[56] References Cited
U.S. PATENT DOCUMENTS

| | | | |
|---|---|---|---|
| 2,366,909 | 1/1945 | Johnson | 144/34 E |
| 3,946,776 | 3/1976 | Oldenburg et al. | 144/34 E |

*Primary Examiner*—Othell M. Simpson
*Assistant Examiner*—W. D. Bray
*Attorney, Agent, or Firm*—Phillips, Moore, Weissenberger, Lempio & Strabala

[57] ABSTRACT

A shear assembly has frame means to which a first member is pivotally mounted. A second member comprising a blade is pivotally mounted to the first member, with the first and second members being positionable on opposite sides of the body of a tree. Extension of a cylinder interconnecting the second member and frame means provides a scissoring action of the first and second members to provide shearing of the tree. Means are included for providing that upon withdrawal of the second member from the body of the tree, the first member is also withdrawn therefrom.

9 Claims, 8 Drawing Figures

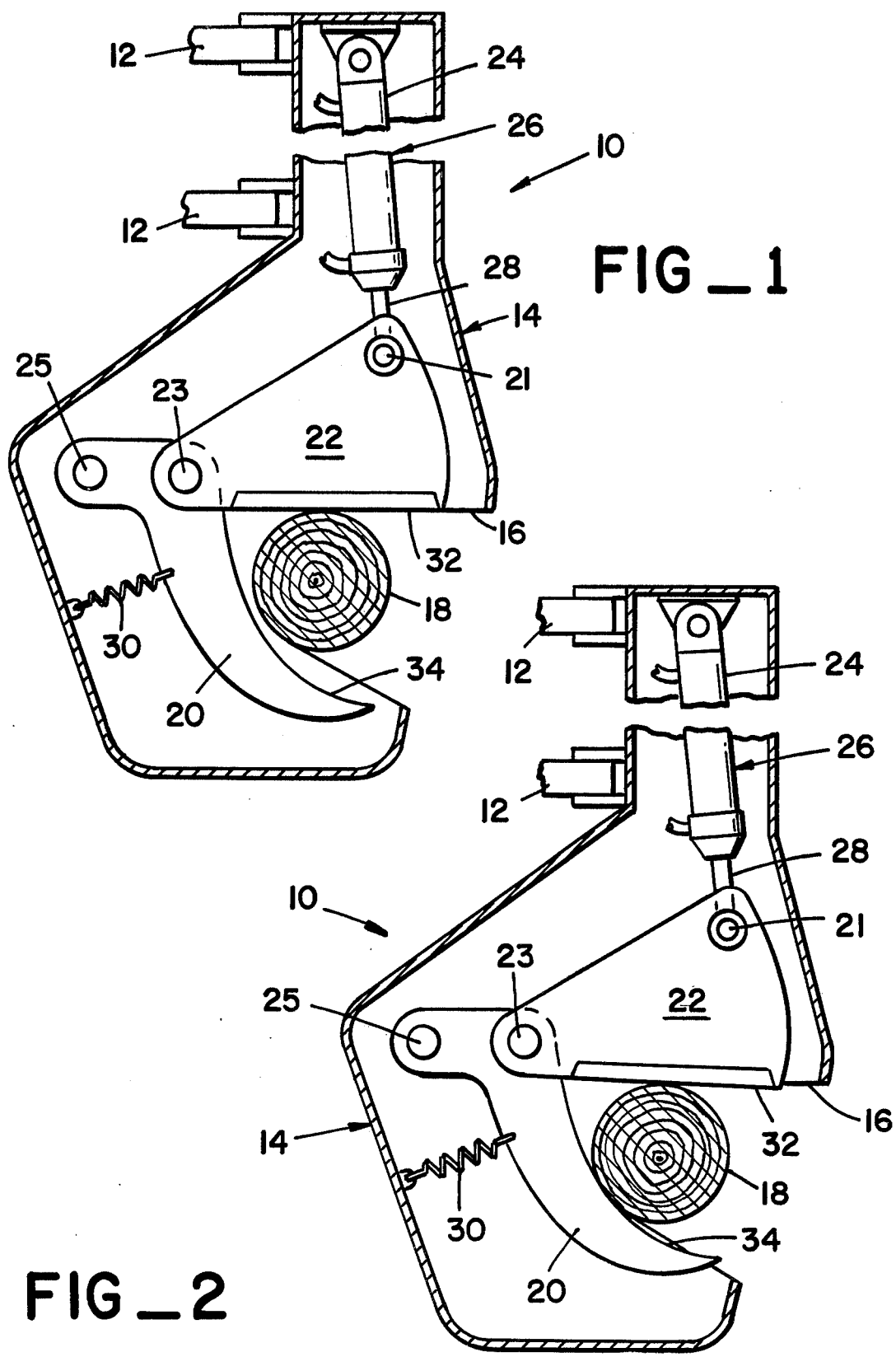

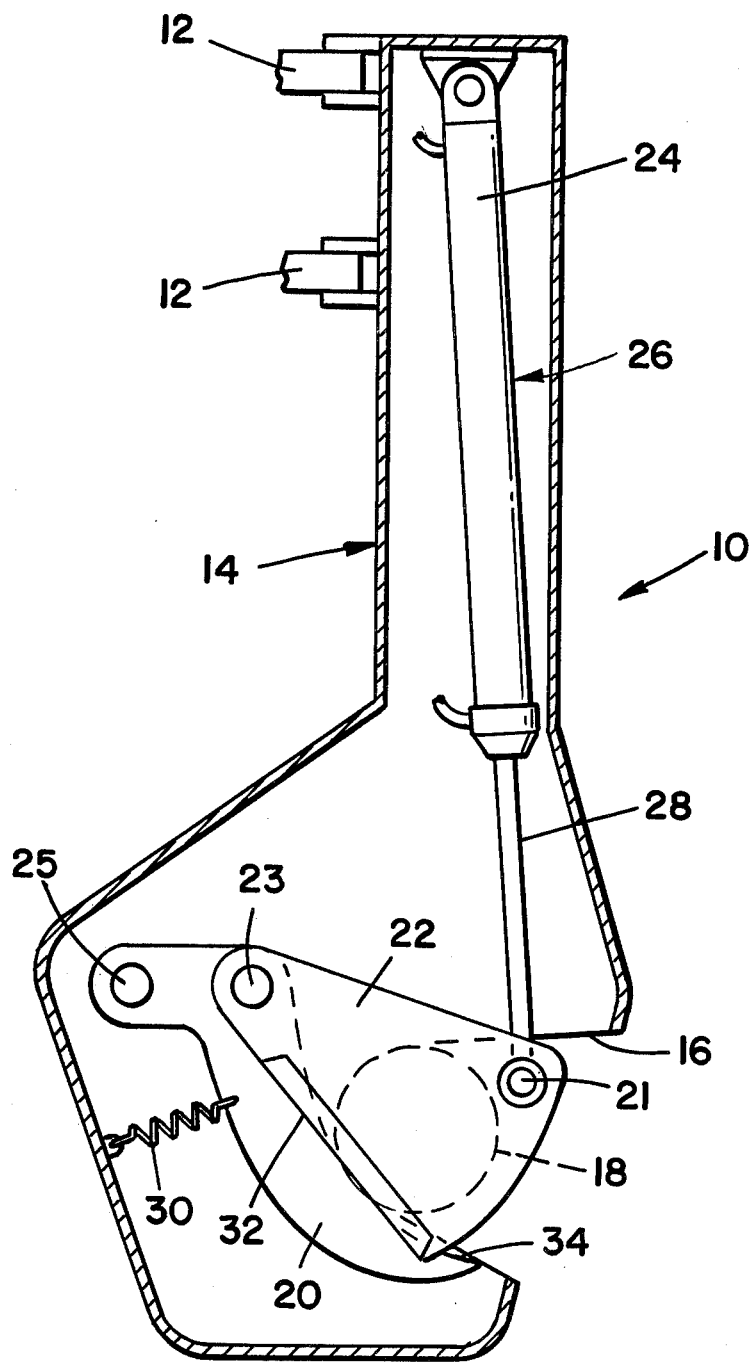
FIG_3

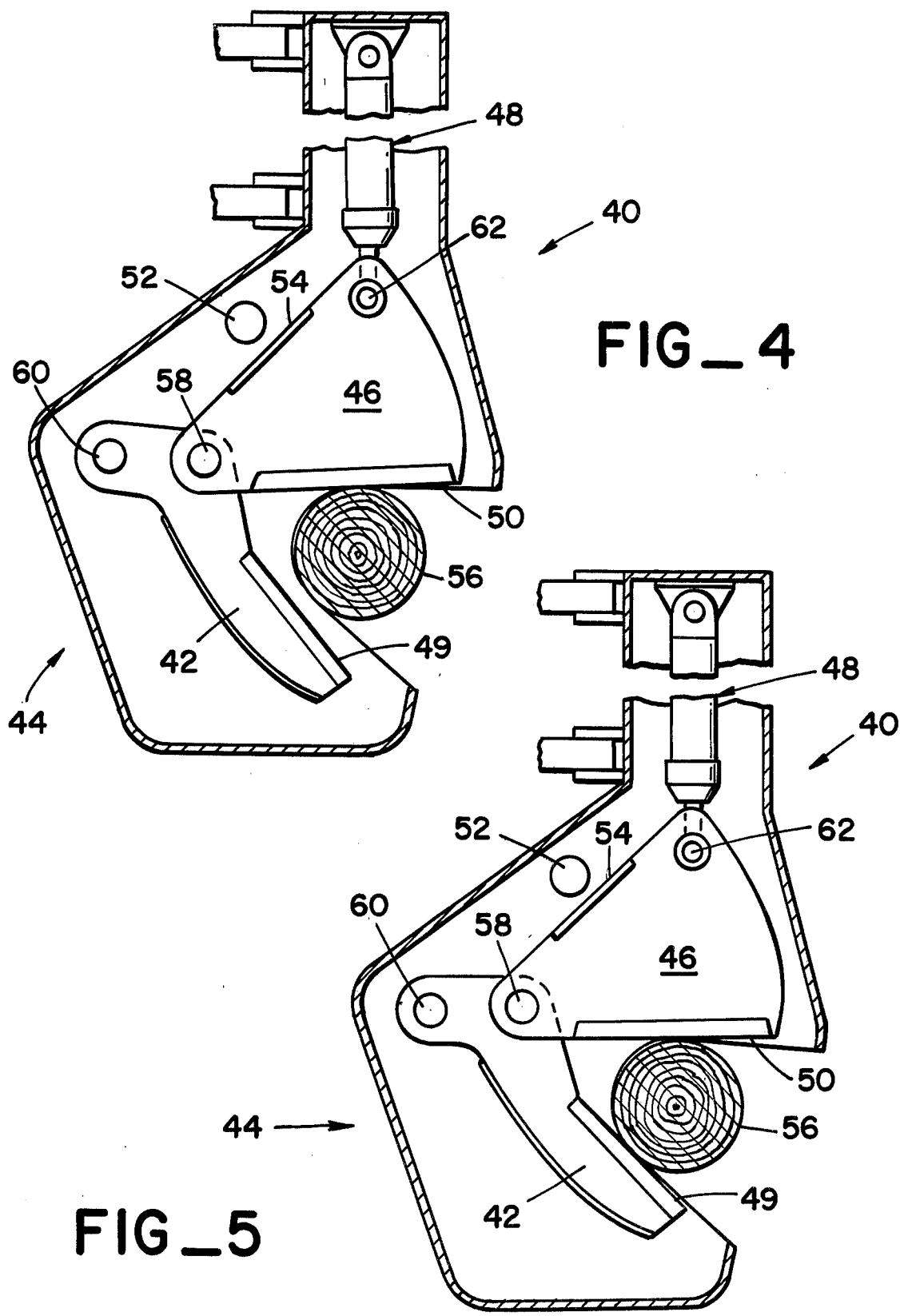

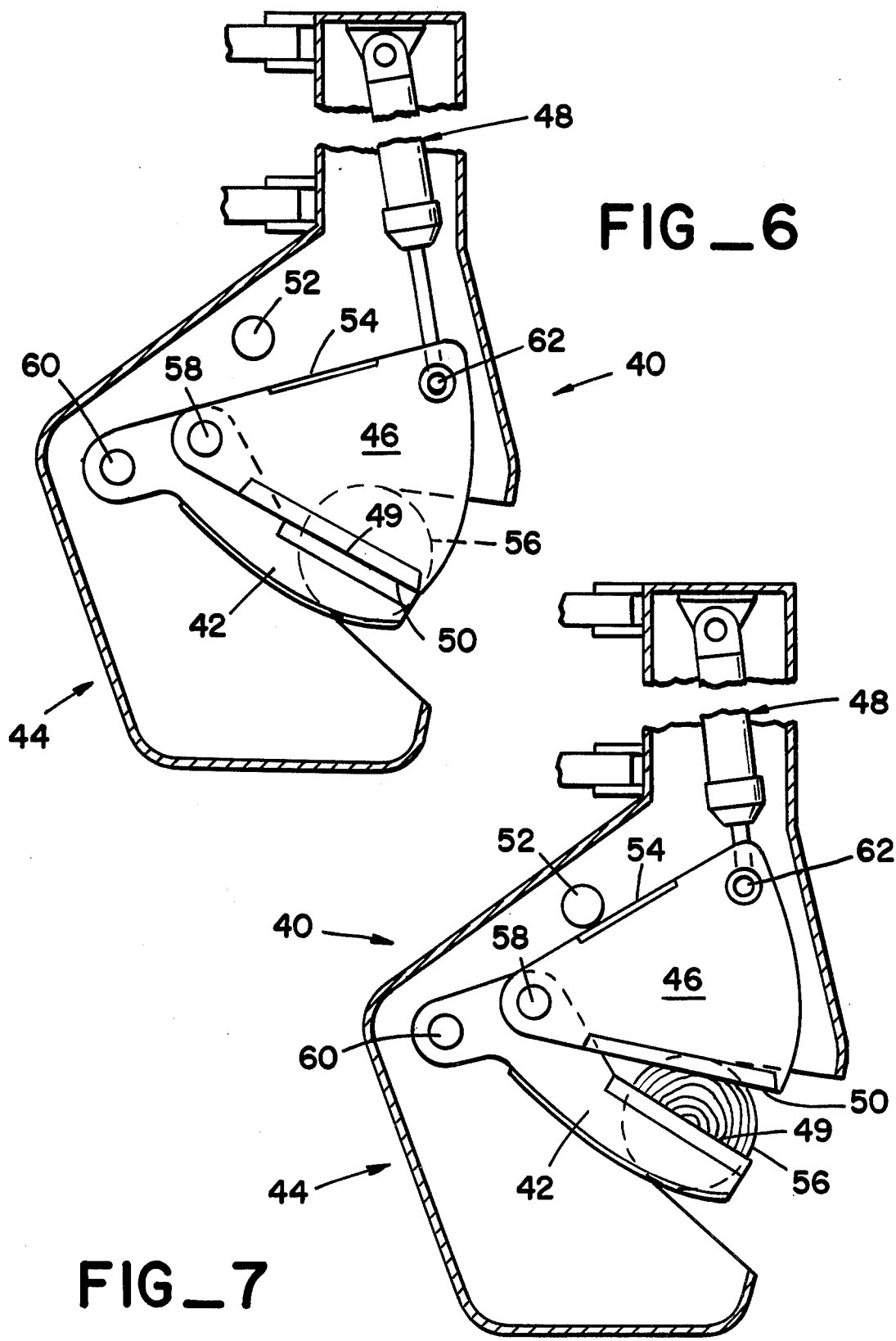

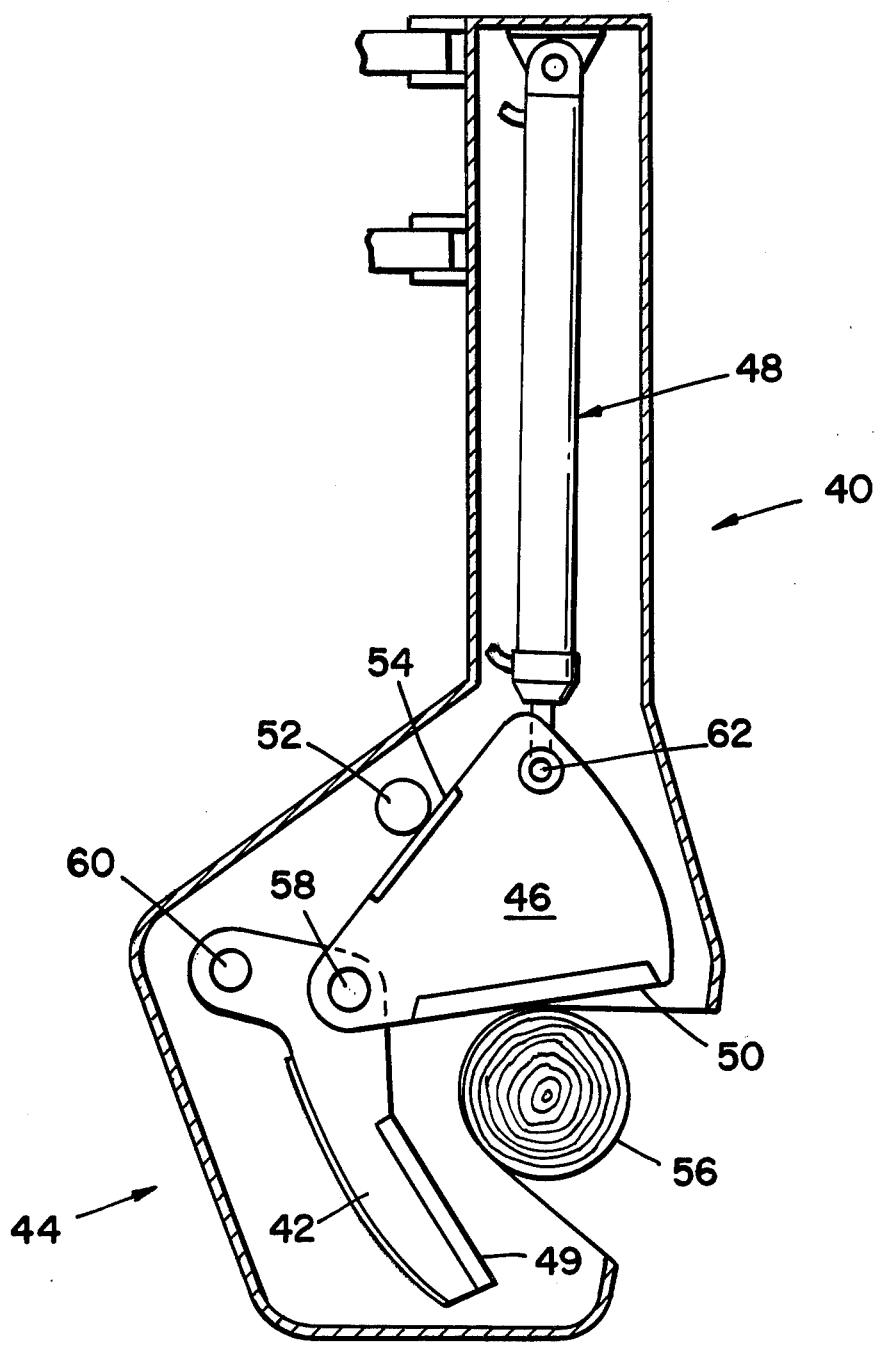
FIG_8

4,151,868

SHEAR ASSEMBLY HAVING PRIMARY AND SECONDARY MEMBERS

BACKGROUND OF THE INVENTION

This invention relates to tree shear apparatus, and more particularly, to tree shear apparatus including a first member pivotally mounted relative to frame means, and a second member pivotally mounted relative to the first member.

U.S. Pat. No. 3,509,922 3,565,141 disclose tree shear systems wherein blades are actuated to move inwardly to cut the body of a tree. Each of these systems in fact includes three blades movable in cooperation with each other to provide appropriate shearing of the body of the tree.

While such systems have been found to be generally efficient in use, it will be understood that increases in shearing efficiency are always desirable, along with overall more simplified construction.

SUMMARY OF THE INVENTION

It is accordingly an object of this invention to provide tree shear apparatus which allows achievement of effective shearing of the body of a tree.

It is a still further object of this invention to provide apparatus which, while fulfilling the above object, is extremely simple in design and efficient in use.

Broadly stated, such apparatus for cutting the body of a tree comprises frame means, and a first member pivotally mounted relative to the frame means. A second member is pivotally mounted to the first member. One of the first and second members comprises a blade. The body of the tree is positionable generally between the first and second members, and means are included for moving one of the first and second members into the body of the tree to provide movement of the other of the first and second members into the body of the tree.

BRIEF DESCRIPTION OF THE DRAWINGS

The and other objects of the invention will become apparent from a study of the following specification and drawings, in which:

FIG. 1 is a plan view, with portions removed, of the apparatus;

FIG. 2 is a view similar to that shown in FIG. 1, but with the apparatus partially actuated;

FIG. 3 is a view similar to that shown in FIGS. 1 and 2, but with the shearing of the body of the tree having taken place;

FIG. 4 is a view similar to that shown in FIG. 1, but of a second embodiment of the invention;

FIG. 5 is a view similar to that shown in FIG. 4, but with the first and second members in contact with the body of the tree;

FIG. 6 is a view similar to that shown in FIGS. 4 and 5, but showing the first and second members having sheared the body of the tree;

FIG. 7 is a view similar to that shown in FIGS. 4–6, but with one of the members being partially withdrawn from the body of the tree; and FIG. 8 is a view similar to that shown in FIGS. 4–7, but with both the first and second members withdrawn from the body of the tree.

DESCRIPTION OF THE PREFERRED EMBODIMENT

Shown in FIGS. 1–3 is a first embodiment of the present tree shear apparatus 10. Such apparatus may be mounted to the first of a vehicle by arms 12 as is well known. The apparatus 10 includes frame means 14 defining a generally U-shaped recess 16, the body of 18 of a tree being positionable within the recess upon appropriate positioning of the vehicle and frame means. Grapple arms (not shown) are mounted to the frame means 14 as is well known, for selective gripping of the body 18 of the tree.

The frame means 14 has pivotally mounted thereto an anvil member 20, and a blade member 22 is pivotally mounted to the anvil member 20. The head end 24 of a cylinder 26 is pivotally connected to the frame means 14, and the rod end 28 of the cylinder 26 is pivotally connected to the blade 22. A resilient spring 30 interconnects the anvil 20 and the frame means 14 for biasing the anvil 20 away from the body 18 of a tree positioned between the blade 22 and anvil 20.

With the cylinder 26 in its fully retracted position, the anvil 20 and blade 22 are sufficiently spread apart so that the body 18 of a tree is positionable generally between the anvil 20 and the blade 22. In fact, due to the resilient urging of the spring 30, a gap is defined between the anvil 20 and the body 18 of the tree. Initial extension of the cylinder 26 brings the cutting edge 32 of the blade 22 into contact with the body 18 of the tree. The pivotal connection 21 of the rod 28 and the blade 22, and the pivotal connection 23 of the blade 22 and the anvil 20, along with the pivotal connection 25 of the anvil 20 and frame means 14, are so positioned relative to the contacting of the cutting edge 32 with the body 18 of the tree, that a clockwise rotation of the blade 22 takes place, without any actual cutting of the body 18 of the tree occurring at this point. Such clockwise rotation draws the surface 34 of the anvil 20 into contact with the body 18 of the tree against the resilience of the spring 30 (see FIG. 2).

Further extension of the cylinder 26 provides that the blade 22 actually cuts through the body 18 of the tree, the surface 34 of the anvil 20 remaining in contact with the body 18 of the tree on the opposite side of the cut, because of the appropriate placement of the pivots 21,23,25 as described above, in relation to the actual cutting surface 32 of the blade 22 in contact with the body 18 of the tree. Retraction of the cylinder 26 withdraws the blade 22 from the body 18 of the tree, and the resilient spring 30 acts to urge the anvil 20 back into the position shown in FIG. 1.

Shown in FIGS. 4–8 is a second embodiment 40 of the invention. As shown therein, a first blade 42 is pivotally mounted to the frame means 44, and a second blade 46 is pivotally mounted to the first blade 42. A hydraulic cylinder 48 interconnects the frame means 44 and blade 42, similar to the previous embodiment, with the pivots 58,60,62 being similarly positioned in relation to the contact of the cutting edge 50 of the blade 46 with the body of the tree, as in the previous embodiment. A roller 52 is mounted relative to the frame means 44 on the rearward side 54 of the blade 46. Initially, the frame means 44 is positioned so that the body 56 of the tree is disposed between the cutting edges 49,50 of the blades 42,46, with the cylinder 48 fully retracted. Initial extension of the cylinder 48 brings the cutting edge 50 of the blade 46 into contact with the body 56 of the tree, to rotate the blade 46 clockwise to an extent, bringing the cutting edge 49 of the blade 42 into contact with the body 56 of the tree generally on the opposite side thereof. During such action, the rearward side 54 of the blade 46 is not in contact with the roller 52, but there is a gap defined therebetween.

Further extension of the cylinder 48 provides a scissoring action of the blades 42,46, due to the positioning of the pivots 58,60,62 relative to the actual contact of the cutting edge 50 of the blade 46 with the body 56 of the tree. Both blades 42,46 are drawn together through the body 56 of the tree, as shown in FIG. 6, to provide a proper cut of the body 56 of the tree.

Upon the full cutting action taking place, the cylinder 48 is retracted to withdraw the blade 46 from the body 56, until the rearward edge 54 thereof contacts the roller 52. Further retraction of the cylinder 48, it will be seen, because of the positioning of the pivots 58,60,62 and the roller 52, rotates the blade 46 in a counterclockwise fashion, forcing the pivot 58 downwardly as shown in FIG. 7, to in turn provide withdrawal of the blade 42 from the body 56.

It will be seen that because of the particular structure wherein one member is pivotally mounted relative to the frame means, and the other member is pivotally mounted to the one member, proper scissoring action for shearing the tree takes place, with it only being necessary that a single cylinder be involved for providing such shearing, without the necessity of any relatively complicated linkage being included to provide such proper cutting.

What is claimed is:

1. Apparatus for cutting the body of a tree comprising:
    frame means;
    a first member pivotally mounted to the frame means;
    a second member pivotally mounted directly to the first member;
    one of said first and second members comprising blade means;
    the body of a tree being positionable generally between the first and second members; and
    means for moving one of said first and second members into the body of a tree to provide movement of the other of the first and second members into the body of a tree, wherein said means for moving one of said first and second members into the body of a tree is pivotally mounted to said second member.

2. The apparatus of claim 1 and further comprising resilient spring means interconnecting the first member and frame means for biasing the first member away from a body of a tree.

3. The apparatus of claim 2 wherein the second member comprises a blade member, and wherein the first member comprises an anvil member.

4. The apparatus of claim 1 wherein the means for moving one of said first and second members comprise cylinder means pivotally connecting the frame means and second member.

5. The apparatus of claim 1 wherein the first and second members comprise first and second blade means.

6. Apparatus for cutting the body of a tree comprising:
    frame means;
    a first member pivotally mounted to the frame means;
    a second member pivotally mounted directly to the first member;
    one of said first and second members comprising blade means;
    the body of a tree being positionable generally between the first and second members; and
    means for moving one of said first and second members into the body of a tree to provide movement of the other of the first and second members into the body of a tree, wherein the means for moving one of said first and second members comprise cylinder means pivotally connecting the frame means and second member.

7. Apparatus for cutting the body of a tree comprising:
    frame means;
    a first member pivotally mounted to the frame means;
    a second member pivotally mounted directly to the first member;
    one of said first and second members comprising blade means;
    the body of a tree being positionable generally between the first and second members; and
    means for moving one of said first and second members into the body of a tree to provide movement of the other of the first and second members into the body of a tree, wherein the means for moving one of said first and second members pivotally connects the frame means and second member, and further comprising a body secured relative to the frame means, and positioned to be contacted by the second member upon sufficient actuation of the means for moving one of said first and second members to withdraw the second member from the body of a tree, whereby further such actuation of the means for moving one of said first and second members provides that the second member is pivoted relative to the frame means to provide withdrawal of the first member from the body of a tree.

8. The apparatus of claim 7 wherein the body secured relative to the frame means comprise roller means.

9. The apparatus of claim 8 wherein the first and second members comprise first and second blade means.

* * * * *